(12) United States Patent
Uderani et al.

(10) Patent No.: US 11,100,454 B1
(45) Date of Patent: Aug. 24, 2021

(54) CDD WITH HEURISTICS FOR AUTOMATED VARIABLE USE-CASE BASED CONSTRAINED LOGISTICS ROUTE OPTIMIZATION

(71) Applicants: Karan Uderani, Mumbai (IN); Ketan Kumar Yadav, Kanpur (IN)

(72) Inventors: Karan Uderani, Mumbai (IN); Ketan Kumar Yadav, Kanpur (IN)

(*) Notice: Subject to any disclaimer, the term of this patent is extended or adjusted under 35 U.S.C. 154(b) by 0 days.

(21) Appl. No.: 16/841,321

(22) Filed: Apr. 6, 2020

(51) Int. Cl.
*G06F 15/173* (2006.01)
*G06Q 10/08* (2012.01)
*H04L 12/24* (2006.01)

(52) U.S. Cl.
CPC ... *G06Q 10/08355* (2013.01); *H04L 41/0813* (2013.01); *H04L 41/5041* (2013.01)

(58) Field of Classification Search
CPC ............ G06Q 10/0835; H04L 41/0813; H04L 41/5041
See application file for complete search history.

(56) References Cited

U.S. PATENT DOCUMENTS

| 10,069,869 | B2* | 9/2018 | Lewis | H04L 63/083 |
| 2014/0146961 | A1* | 5/2014 | Ristock | H04M 3/5234 379/265.12 |
| 2014/0177821 | A1* | 6/2014 | Ristock | G06Q 10/0631 379/266.08 |
| 2016/0164723 | A1* | 6/2016 | Cimprich | H04L 67/2823 709/221 |
| 2016/0373476 | A1* | 12/2016 | Dell'Anno | G06F 16/254 |
| 2017/0200240 | A1* | 7/2017 | Marinelli | H04L 41/0681 |
| 2020/0210924 | A1* | 7/2020 | Ghosh | G06Q 10/06393 |
| 2020/0293503 | A1* | 9/2020 | P | G06F 16/217 |

* cited by examiner

*Primary Examiner* — Thanh T Nguyen

(57) ABSTRACT

In one aspect, a computerized method for automatically implementing Service-level agreement (SLA) to JavaScript Object Notation (JSON) mapping engine in an automated routing system includes the step of providing an SLA agreement in a digital format. The method includes the step of implementing a parameterization of the SLA agreement with a heuristic evaluator. The method includes the step of, based on the parameterization, generating a set of metrics. The method includes the step of from the set of metric, generating a JSON tree. The method includes the step of tuning the JSON tree with a weight of a relevant metric of the set of metrics, wherein the set of metrics sets an allowed range of parameters to take into consideration by a route planning algorithm. The method includes the step of providing the tuned configuration of the JSON tree to an automated routing engine during routing for use in a set of route decision making operations.

8 Claims, 7 Drawing Sheets

(f) Optimize the product loads for delivery from each location on a real-time basis based on orders for products as specified by the shipper for each location, in order to minimize the distance of product shipment, maximize truck volume utilization, and deliver products as expeditiously as practicable. Shipper shall be given access to the load optimization system so that it may perform load optimization as needed, for testing and modelling purposes or actual use, at no additional charge to the shipper. Specifications for the load optimization system and processes are defined in Exhibit (list exhibit letter).

(h) (a) Arrange for and carry out not more than a fifteen-minute delay of the transportation services associated with the shipment of products and goods from and to each location.

Is there any acceptable delay possible in the delivery of goods?

a. Yes
b. No

What is the maximum allowed delay for the above?

15 mins

What is of higher preference?

a. Use of all vehicles
b. maximum Truck Volume Utilization
c. 3PL Contract Cost

Contracts should be optimized basis on?
a. DISTANCE
b. TOTAL_TIME
c. TRAVEL_TIME

```
"optimizeDistances":true,
 "fairnessMode": MAX_VOLUME/USE_ALL_VEHICLES,
 "tardiness": 900,
 "rescheduleConfig": {
   "slotWidthMins": 60,
   ....
   ...
   "shift": {
   "startTime": "08:00",
   "endTime": "20:00"
   },
   ...
   "canExtendSlotEnd": false,
   ...
   "resetVisitOnReschedule": false
   },
```

CDD WITH HEURISTICS FOR AUTOMATED VARIABLE USE-CASE BASED CONSTRAINED LOGISTICS ROUTE OPTIMIZATION

BACKGROUND

Logistics and service-level logistics can include various problems. Optimizing and correcting these can require effort, costs incurred, time loss to meet the relevant SLAs (Service Level Agreements. However, each particular use case can vary in nature. For example, use cases can vary between a set of e-commerce warehouse performing deliveries (e.g. Single Pickup-Multiple Drop scenario) or operating a mailing service (e.g. Multiple Pickup and Multiple Drop scenario). It is noted that new service-based markets have emerged which cater to various needs via direct visits to customers. These can be used to leverage optimizations at various levels. However, each use case presents a different problem and constraints to optimize upon. To achieve optimization to cater to the needs of each use case, there is a need to create algorithms that solve the individual use case. However, these can be costly and effort-intensive thus reducing the solutions return on resource investment. Accordingly, there is a need to solve these use cases with multiple solutions in a manner that is not cumbersome and does not lose the solution's importance.

BRIEF SUMMARY OF THE INVENTION

In one aspect, a computerized method for automatically implementing Service-level agreement (SLA) to JavaScript Object Notation (JSON) mapping engine in an automated routing system includes the step of providing an SLA agreement in a digital format. The method includes the step of implementing a parameterization of the SLA agreement with a heuristic evaluator. The method includes the step of, based on the parameterization, generating a set of metrics. The method includes the step of from the set of metric, generating a JSON tree. The method includes the step of tuning the JSON tree with a weight of a relevant metric of the set of metrics, wherein the set of metrics sets an allowed range of parameters to take into consideration by a route planning algorithm. The method includes the step of providing the tuned configuration of the JSON tree to an automated routing engine during routing for use in a set of route decision making operations.

BRIEF DESCRIPTION OF THE DRAWINGS

FIG. 5 illustrates an example snippet of an SLA, according to some embodiments.

FIG. 6 illustrates snippet of a question and answer text, according to some embodiments.

FIG. 7 illustrates an example snippet of JSON Schema, according to some embodiments.

Figure 1:
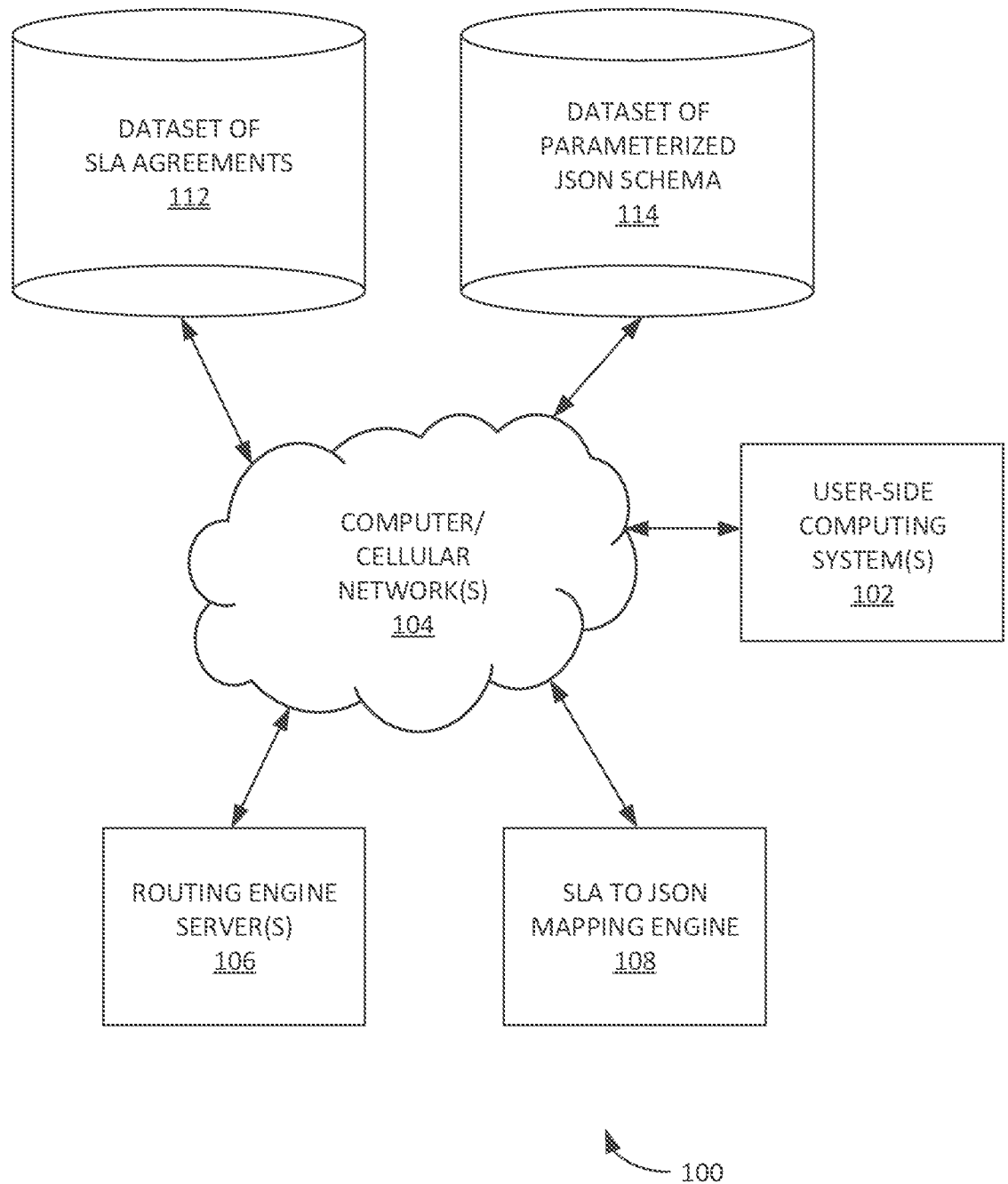
FIG. 1 illustrates an example system for implementing SLA to JSON mapping engine, according to some embodiments.

The Figures described above are a representative set and are not an exhaustive with respect to embodying the invention.

DESCRIPTION

Disclosed are a system, method, and article of CDD (Configuration Driven Development) with heuristics for automated variable use-case based constrained logistics route optimization. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Autonomous vehicle (AV) is a vehicle that is capable of sensing its environment and moving safely with little or no human input. AVs can combine a variety of sensors to perceive their surroundings, such as radar, lidar, sonar, GPS, odometry and inertial measurement units. Advanced control systems interpret sensory information to identify appropriate navigation paths, as well as obstacles and relevant signage.

Boolean Toggle enables a change between single true and false values as inputs.

Cloud computing can involve deploying groups of remote servers and/or software networks that allow centralized data storage and online access to computer services or resources. These groups of remote serves and/or software networks can be a collection of remote computing services.

Capacitated Vehicle Routing Problem with Time-Windows (CVRPTW) relates to constraints on both the vehicle and the delivery order (e.g. refers to time window [slot] in which the delivery needs to happen).

JavaScript Object Notation (JSON) is an open standard file format, and data interchange format, that uses human-readable text to store and transmit data objects consisting of attribute-value pairs and array data types (and/or any other serializable value).

JSON tree structure can include a set of tree nodes. Each tree node has a set of properties. These properties can include, inter alia: a unique identifier for the node; name a node's name; data property contains a dataset. For example, an array of key-value objects can be defined by the user. This can include information each node. The tree can include an array of children nodes and/or an empty array if the node is a leaf node.

Routing is the process of selecting a path for traffic.

Service-level agreement (SLA) is a commitment between a service provider and a client. Example aspects of the service—quality, availability, responsibilities—are agreed between the service provider and the service user. A common component of an SLA is that the services should be provided to the customer as agreed upon in the contract.

Vehicle routing problem (VRP) is a combinatorial optimization and integer programming problem which asks: "What is the optimal set of routes for a fleet of vehicles to traverse in order to deliver to a given set of customers?".

Example Systems

FIG. 1 illustrates an example system 100 for implementing SLA to JSON mapping engine, according to some embodiments. System 100 can use a CDD (Configuration Driven Development) with heuristic algorithm to solve variable use case based constrained logistics route optimization problems. System 100 implements solutions to the CVRPTW with a single routing algorithm driven via set of configurations configurable at client and business units levels providing the flexibility to cater to a wide variety of clients and their constrained use cases over single logic. Business constraints lead configurations tuning for maximum optimization with minimal extra code paths.

In one example, a supply chain optimization entity can use routing system 100. Routing system 100 can include a routing engine server(s) 106. Routing engine server(s) 106 can include one or more routing engines. A routing engines can create a delivery plan of those orders distributed into vehicles. Routing engines can use process 300 and 400 to optimize the delivery plan.

Routing system 100 can include user-side computing system(s) 102. User-side computing system(s) 102 can include various geo-location applications, navigation applications and/or mapping applications. Routing information can be communicated to these application. For example, navigation application can use an Internet connection to a GPS navigation system to provide turn-by-turn voice-guided instructions on how to arrive at a given destination. The navigation application can use a connection to Internet data (e.g. 3G, 4G, WiFi, etc.) and use a GPS satellite connection to determine the user-side computing system(s) 102. Local addresses, regions and/or POI (point of interest) can be identified and updates (e.g. using processes 300 and 400, etc.). Generally, the user/client-side computing systems [102] are thin clients and the majority of the data [geocoding data, mapping data, routing data] is produced and processed by the server-side computing system and pushed to user/client side computing system to provide a view to facilitate actions. Although, status, updates and usage data may be sent the other way (see infra).

User-side computing system(s) 102 can be mobile device(s), laptops, etc. that includes an automated salesbeat optimization application (e.g. a sales-fleet management application). User-side computing system(s) 102 can communicate delivery and/or load allocation information to Routing engine server(s) 106.

Computer/Cellular networks 104 can include the Internet, text messaging networks (e.g. short messaging service (SMS) networks, multimedia messaging service (MMS) networks, proprietary messaging networks, instant messaging service networks, email systems, etc. Computer/Cellular networks 104 can include cellular networks, satellite networks, etc. Computer/Cellular networks 104 can be used to communicate messages and/or other information (e.g. videos, tests, articles, digital images, videos etc.) from the various entities of routing system 100.

Routing engine server(s) 106 can include various other functionalities such as, inter alia: web servers, SMS servers, IM servers, chat bots, database system managers, e-commerce engines, geo-mapping functionalities, web mapping services, etc. Routing engine server(s) 106 can include manage a mobile-device application in both user-side computing device(s) 102.

Routing engine server(s) 106 can manage an API service which clients may communicate with via RESTful HTTP APIs. These APIs enable a client to pass input data like details of batch of orders to be fulfilled, vehicle information and configurations. This API system stores the details and invokes the route optimization engine to come up with a delivery plan. Routing engine server(s) 106 can accept additional orders on the same batch of orders once the delivery plan is generated. The routing engine can build an incremental solution using an existing delivery plan and newer orders added to the existing batch of orders. The API service can accept newer orders on the same batch of tasks. The routing engine can create an incremental plan based on an existing delivery plan and additional orders.

Routing engine server(s) 106 can manage messages about the batch of orders and existing delivery plan. Data can be stored and read from a common database. Messages containing metadata are passed using queues, and the systems fetch the required data from the database by querying using the metadata from the message.

SLA to JSON mapping engine 108 can interface with routing engine server(s) 106. SLA to JSON mapping engine 108 can provide map relevant SLAs to JSON pairs. SLA to JSON mapping engine 108 can implement customizations at multiple levels. These levels can be at client or business unit level based on their modus operandi. The SLA to JSON mapping engine 108 can emit a key-value pair of tuned parameterized configuration optimized for the use case which is fed into the algorithm to be used by a Capacitated Vehicle Routing Problem with Time Windows (CVRPTW) solver. Accordingly, SLA to JSON mapping engine 108 can include a CVRPTW solver.

Business constraints/metrics are mapped to key parameters in the configuration. Tuning is achieved through the weight of each metric which sets the allowed range of parameters to take into consideration by the planner algorithm. Individual parameter toggle allows for complete discard of non-applicable constraints.

As shown, routing engine server(s) 106 and SLA to JSON mapping engine 108 108 can interact with any client systems (e.g. dispatcher(s) computing device(s) 102, etc.). Clients can automatically or manually load vehicles according to the delivery plan generated by the routing engine mentioned. In this way, routing system 100 can simplify operations as vehicles do not have to be reloaded completely on every optimization run.

SLA to JSON mapping engine 108 can manage and update dataset of parameterized JSON Schema 114. Dataset of parameterized JSON Schema 114 can include various JSON structures that are maintained to store the use-case in the form of a tuned configuration. This structure can be expanded by SLA to JSON mapping engine 108 to support more use cases and drive the algorithm without any or limited code modifications to deliver the most optimal result. Applicable SLAs can be stored in dataset of SLA agreements 112.

Routing engine server(s) 106 and SLA to JSON mapping engine 108 can utilize machine learning techniques (e.g. artificial neural networks, etc.). Machine learning techniques can be used to improve confidence classifications and/or other automated aspects provided herein. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

In an alternate embodiment of system 100, the dataset of SLA agreements 112 can go through SLA to JSON mapping engine 108 to produce the dataset of parameterized JSON schema 114. In another interaction, system 100 can also be modified as the user-side computing system 102 is connected to routing engine server(s) 106 via network(s) 104 and uses dataset of parameterized JSON schema 114 as input.

Figure 2:
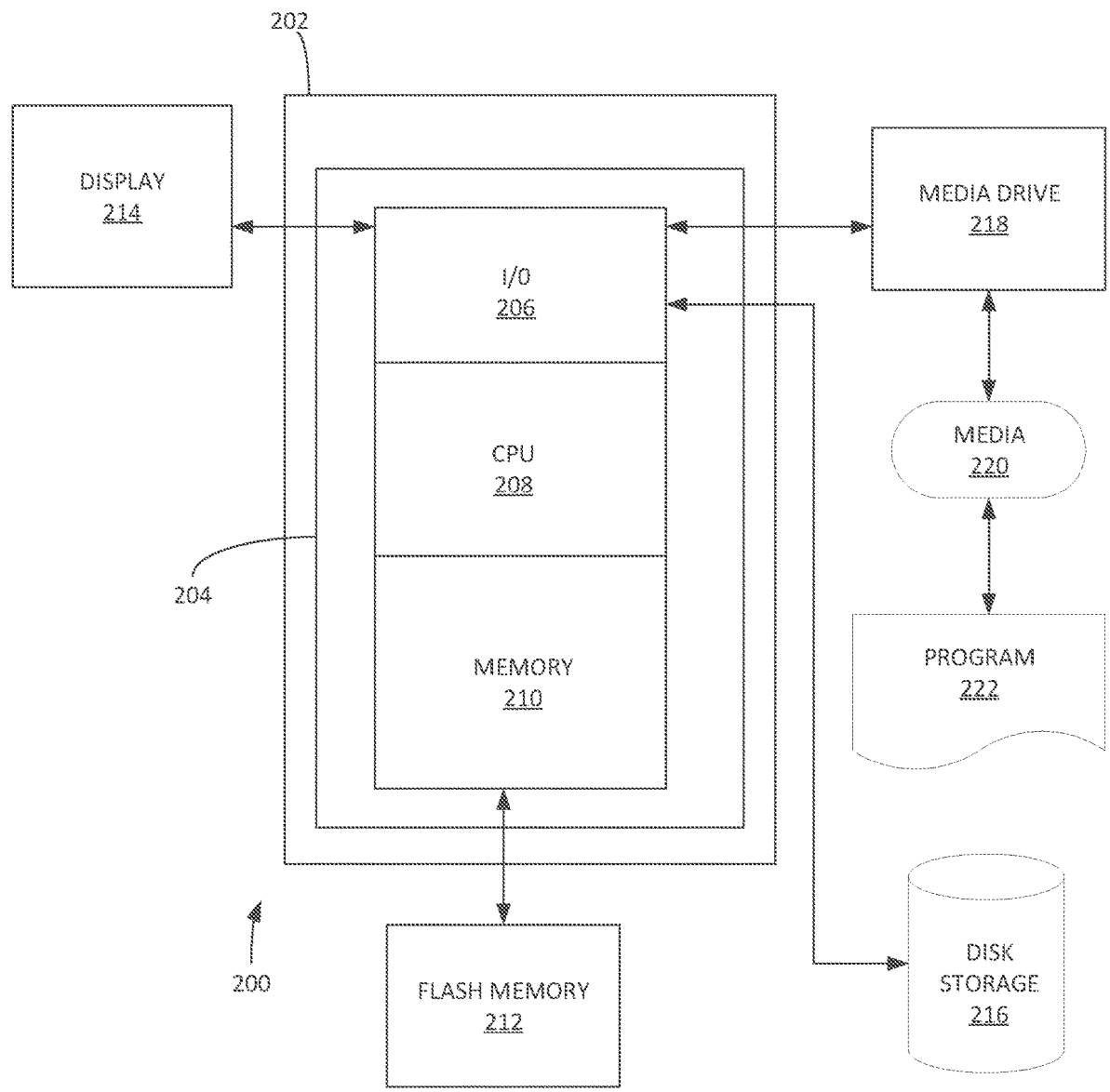
FIG. 2 is a block diagram of a sample computing environment that can be utilized to implement various embodiments.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Example Methods

Figure 3:
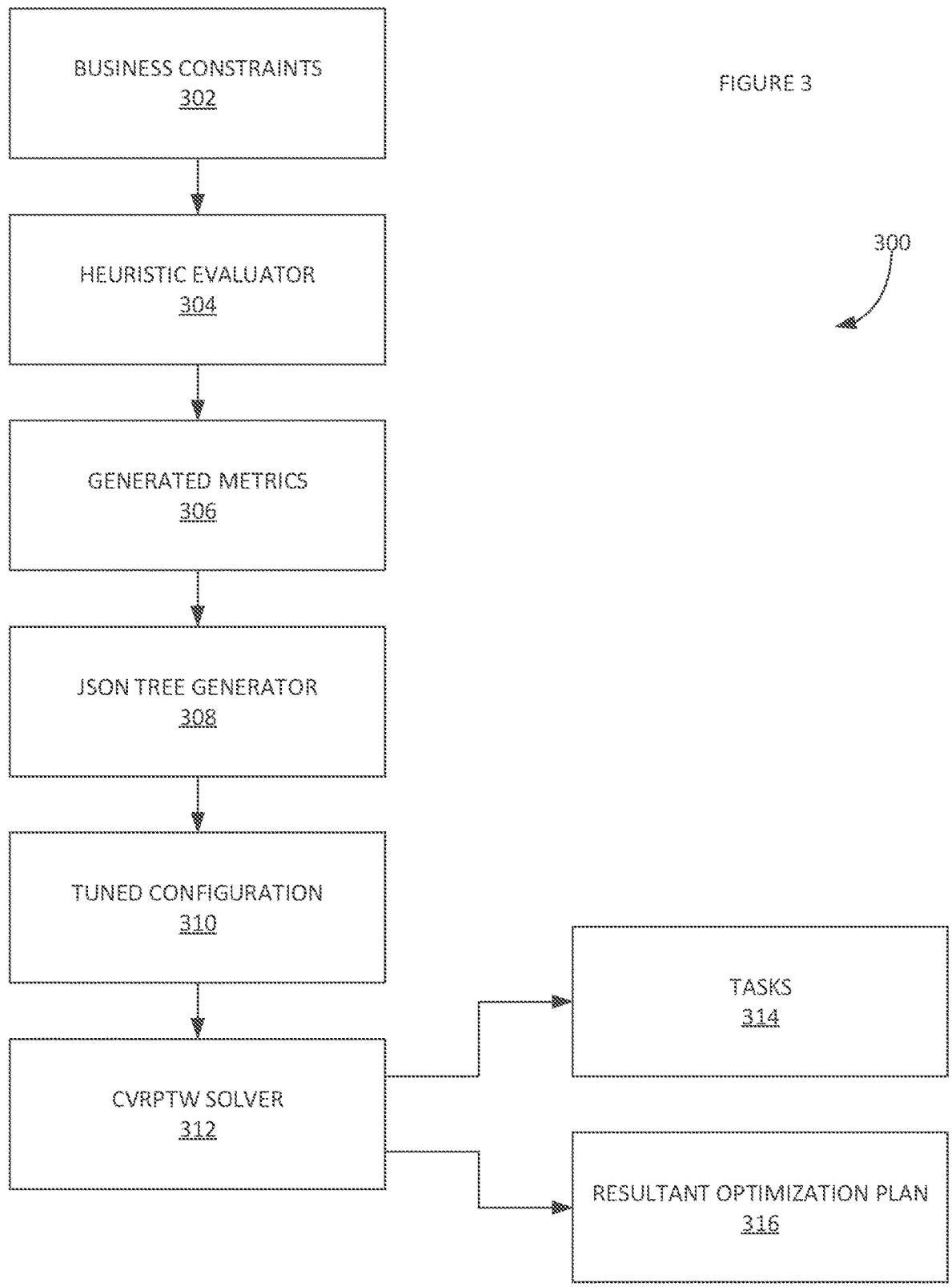
FIG. 3 illustrates an example process for implementing CDD with heuristics for automated variable use-case based constrained logistics route optimization, accordingly to some embodiments.

FIG. 3 illustrates an example process 300 for implementing CDD with heuristics for automated variable use-case based constrained logistics route optimization, accordingly to some embodiments. Process 300 can be used to map individual SLAs to generic configurable parameterized configuration JSON Schema. In step 302, a set of business constraints are obtained an analyzed.

In step 304, the set of business constraints are used to generate parameterization with a heuristic evaluator. A heuristic evaluator can be used to identify the usability and the utility of a client's requirements. These heuristics can be internally formulated and used when applicable. In one embodiment, an example set of heuristics that can be used by a heuristic evaluator include, inter alia: flexibility levels with the SLAs; optimizer-equalizer: time/costs/resource usage; restrictions (e.g. route/timings, etc.).

In step 306, the generated metrics are obtained. In step 308, process 300 implements a JSON tree generator. In step 310, a tuned configuration is determined. In step 312, the tuned configuration is fed to a solver during routing for decision making. It is noted that process 300 provides hardware-agnostic implementation as long as the basic computational uses are met.

Figure 4:
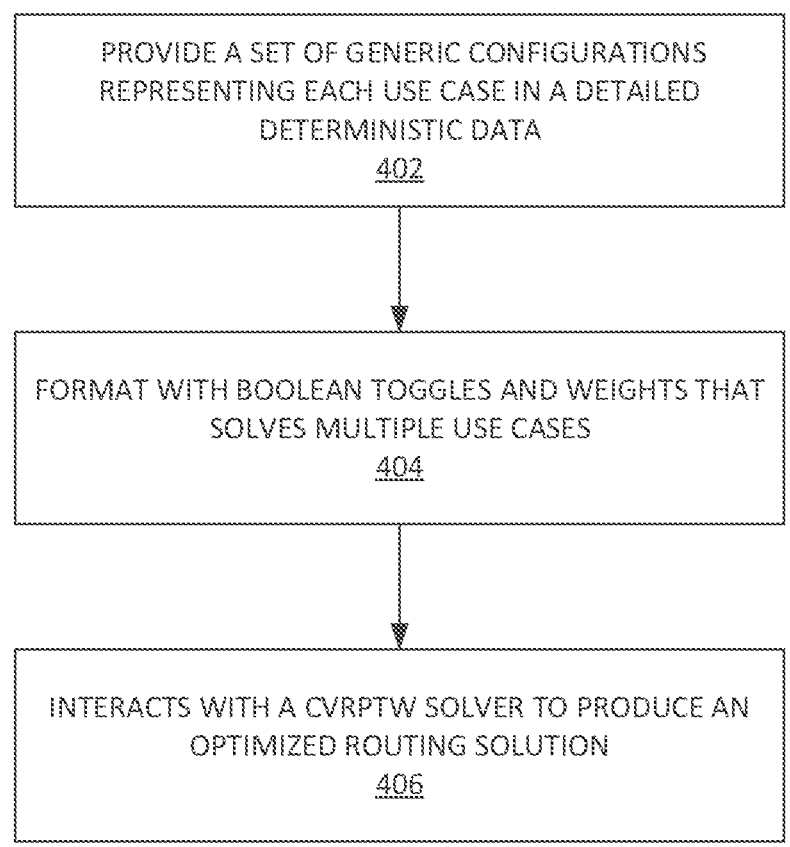
FIG. 4 illustrates another example process for implementing CDD with heuristics for automated variable use-case based constrained logistics route optimization, accordingly to some embodiments.

FIG. 4 illustrates another example process 400 for implementing CDD with heuristics for automated variable use-case based constrained logistics route optimization, accordingly to some embodiments. In step 402, process 400 can provide a set of generic configurations representing each use case in a detailed deterministic data format. In step 404, process 400 can use Boolean toggles and weights to solves multiple use cases in a single solution with minimal to no additional code paths. In this way, process 400 can use business constraints and specific use cases assimilate into metric values to build the normalized parameter values which translate into a JSON key-value pair. Accordingly, in step 406, process 400 can interacts with a CVRPTW solver to produce an optimized routing solution. This can be done with the JSON output of step 404. Process 400 can also provide output to a VDU (Visual Display Unit) for visualization.

Example Use Case

FIG. 5 illustrates an example snippet of an SLA 500, according to some embodiments. SLA 500 can be mapped to a generic configurable parameterized configuration JSON Schema (e.g. see FIG. 7). SLA 500 can include a set of business constraints are obtained an analyzed.

FIG. 6 illustrates snippet of a question and answer text 600, according to some embodiments. Question and answer text 600 can be used with the heuristic evaluator to identify the usability and the utility of a client's requirements.

FIG. 7 illustrates an example snippet of JSON Schema 700, according to some embodiments. JSON Schema 700 can be sent to a CVRPTW solver.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for automatically implementing Service-level agreement (SLA) to JavaScript Object Notation (JSON) mapping engine in an automated routing system comprising:
   providing an SLA agreement in a digital format;
   implementing a parameterization of the SLA agreement with a heuristic evaluator;
   based on the parameterization, generating a set of metrics;
   from the set of metric, generating a JSON tree;
   tuning the JSON tree with a weight of a relevant metric of the set of metrics, wherein the set of metrics sets an allowed range of parameters to take into consideration by a route planning algorithm; and
   providing the tuned configuration of the JSON tree to an automated routing engine during routing for use in a set of route decision making operations.

2. The computerized method of claim 1, wherein an individual parameter toggles of the tuned configuration of the JSON tree allows for a discard of non-applicable constraints.

3. A computerized method for implementing CDD (Configuration Driven Development) with a set of heuristics for an automated variable use-case based constrained logistics route optimization comprising:
   providing a set of business constraints, wherein the set of business constraints is obtained from a digital version of one or more service level agreements (SLAs);
   parameterizing a set of business constraints with a heuristic evaluator, wherein the heuristic evaluator is used to identify a usability value and a utility of a client's requirements for an automated routing;
   generating a set of metrics based on the parameterized a set of business constraints;
   using a JavaScript Object Notation (JSON) tree generator to generate a tuned configuration of the set of metrics in a JSON format; and
   feeding the tuned configuration of the set of metrics in the JSON format is fed to a route solver engine during a routing operating.

4. The computerized method of claim 3, wherein the set of heuristics can be internally formulated and used when applicable.

5. The computerized method of claim 4, wherein the set of heuristics comprises a flexibility levels within the one or more SLAs.

6. The computerized method of claim 5, wherein the set of heuristics comprises an optimizer-equalizer value based on a time usage, a cost usage or a resource usage.

7. The computerized method of claim 6, wherein the set of heuristics comprises a set of route restrictions.

8. The computerized method of claim 7, wherein the set of heuristics comprises a set of timing restrictions.

* * * * *